US012798015B2

(12) United States Patent
Li et al.

(10) Patent No.: US 12,798,015 B2
(45) Date of Patent: Nov. 17, 2026

(54) OMNI-DIRECTIONAL WELD SEAM TRACKING LASER VISION SENSOR, SENSING METHOD, AND WELDING APPARATUS

(71) Applicants: Suzhou Iview Intelligent Technology Co., Ltd., Suzhou (CN); Southeast University, Nanjing (CN)

(72) Inventors: Yongzhe Li, Nanjing (CN); Wenqi Zhong, Nanjing (CN); Zhonghua Ni, Nanjing (CN); Jinlong Zhao, Suzhou (CN); Yijun Zhou, Nanjing (CN); Xiaoyu Wang, Nanjing (CN); Weijuan Zhao, Suzhou (CN); Yanjun Zhao, Suzhou (CN); Hanyi Zhao, Suzhou (CN)

(73) Assignees: Suzhou Iview Intelligent Technology Co., Ltd., Suzhou (CN); Southeast University, Nanjing (CN)

( * ) Notice: Subject to any disclaimer, the term of this patent is extended or adjusted under 35 U.S.C. 154(b) by 0 days.

(21) Appl. No.: 19/372,140

(22) Filed: Oct. 28, 2025

(65) Prior Publication Data

US 2026/0054328 A1 Feb. 26, 2026

(30) Foreign Application Priority Data

Oct. 28, 2024 (CN) ........................ 202411510355.5

(51) Int. Cl.
*B23K 31/12* (2006.01)
*G06T 7/00* (2017.01)
*G06T 7/73* (2017.01)
*H04N 23/698* (2023.01)

(52) U.S. Cl.
CPC ............ *B23K 31/125* (2013.01); *G06T 7/001* (2013.01); *G06T 7/73* (2017.01); *H04N 23/698* (2023.01); *G06T 2207/20212* (2013.01)

(58) Field of Classification Search
CPC .. B23K 31/125; B23K 26/044; B23K 26/032; B23K 9/0956; B23K 9/1274; H04N 23/698
See application file for complete search history.

(56) References Cited

U.S. PATENT DOCUMENTS 6,046,431 A * 4/2000 Beattie ................ B23K 9/1274 219/124.34

FOREIGN PATENT DOCUMENTS

JP 2011255473 * 12/2011

* cited by examiner

*Primary Examiner* — Kathleen V Nguyen

(57) ABSTRACT

The present disclosure discloses an omni-directional weld seam tracking laser vision sensor, a sensing method, and a welding apparatus, relating to the field of welding automation. The sensor includes a sensor housing, a mounting bracket, a filter, a laser, and at least three cameras. The cameras surround a welding gun mounting hole and are uniformly distributed in a peripheral direction; the cameras are configured to capture a laser-closed stripe image formed by a laser beam emitted by the laser; the filter is positioned at the front end of the camera, the wavelength of the light allowed to be passed through is the same as the wavelength of the laser beam emitted by the laser; and the sensor further includes an image processing module arranged in the sensor housing, configured to connect the camera, to receive image information captured by the camera.

8 Claims, 7 Drawing Sheets

OMNI-DIRECTIONAL WELD SEAM TRACKING LASER VISION SENSOR, SENSING METHOD, AND WELDING APPARATUS

TECHNICAL FIELD

The present disclosure relates to the field of welding automation, and more particularly, to an omni-directional weld seam tracking laser vision sensor, a sensing method, and a welding apparatus.

BACKGROUND

A weld seam tracking technology is to automatically detect and automatically adjust a position of a welding gun during a welding process, to follow a weld seam position all the time to perform welding, thereby ensuring welding quality, implementing adaptive control, and improving welding efficiency. A weld seam tracking system mainly includes three parts: a sensor, a control system, and a motion execution mechanism. The sensor is a most important component. Currently, a laser vision sensor has a good application prospect. A weld seam tracking laser vision sensor obtains position information of each point in a laser scanning area by using optical propagation and imaging principles, and completes online real-time detection of a common weld seam by using a complex program algorithm. A device calculates a deviation between a detected weld seam and a welding gun, and outputs deviation data. The motion execution mechanism corrects the deviation in real time, and precisely guides the welding gun to automatically perform welding, thereby implementing real-time communication with a robot control system to track the weld seam to perform welding.

Currently, a laser vision sensor commonly used in the industry is a linear laser sensor, and has a problem that the laser vision sensor has a relatively large volume and easily collides with a workpiece. In addition, the linear laser sensor can only be placed at a front end or a rear end of a welding gun, and is suitable for tracking a long and straight weld seam. For example, Chinese Patent Application No. CN106984926 A, published on Jul. 28, 2017, discloses a weld seam tracking system and a weld seam tracking method. The weld seam tracking system includes a vision sensing apparatus, a holder, a welding gun, a motion mechanism, a computer, and a baffle. The vision sensing apparatus includes a dot laser, a line laser, and an area-array camera. The area-array camera collects an image and transmits the image to a computer. The computer sends an instruction to control the motion mechanism to move in a three-dimensional direction. In such weld seam tracking sensing apparatus, a vision sensing apparatus is separated from a position of a welding gun, and a front-rear guiding relationship is formed on a straight line. When complex spatial curves such as a curved weld seam, a 90°-deflection angle weld seam, and an annular weld seam are tracked, a robot arm needs to drive the welding gun and a sensor to rotate, thereby continuously changing a posture. Especially, when the weld seam with the 90°-deflection angle is tracked, and when a deflection angle of the weld seam is reached, a former one of the welding gun and the sensor reaches a blank area without a weld seam in a straight forward direction earlier than a later one. In this case, a blind area occurs in weld seam detection, a welding process needs to be stopped, a starting point is adjusted after the welding gun and the sensor are rotated, and front and backward cooperation is restarted in a new direction. Consequently, welding cannot be performed continuously, resulting in a problem about welding quality.

Chinese Patent Application No. CN110153602A discloses a multi-directional laser vision tracking sensing apparatus and tracking and control methods thereof. The apparatus includes a laser vision sensor, a special-shaped welding gun, and a computer control system. The laser vision sensor is mounted at a tail end of a robotic arm, and the special-shaped welding gun is mounted at a lower end of a center of the laser vision sensor. The laser vision sensor includes a flange frame, four cameras, three lasers, and an integrated pipeline. The four cameras are uniformly distributed around an upper end of the welding gun. A first camera to a third camera and a first laser to a third camera are respectively pair-mounted on obliquely opposite sides of the flange frame to respectively measure and track weld seams on a front surface, a rear surface, and a side surface. A fourth camera is arranged in another direction, and is configured to observe and monitor a weld seam. A multi-directional laser vision tracker may implement measurement and tracking on cross weld seams, and implement switching and tracking on weld seams in three directions, namely, a longitudinal direction, a horizontal direction, and a vertical direction. Welding of cross weld seams of complex structures such as a #-shaped structure of steel plates and corrugated plates due to space limitations and easy interference between a starting end and an ending end is resolved. The disadvantage is that in the present disclosure, a computer control system needs to pre-read a diagram of a workpiece, and obtain a work structure and theoretical data of positions of the starting end the ending end of the weld seam, for controlling mobile scanning of a plurality of lasers to match a plurality of cameras to complete image collection, which fails to complete tracking and detection of an omni-directional weld seam in real time. In a mounting manner, the apparatus is flexible but is not stable enough in a manner of hanging the plurality of cameras and laser modules through the flange frame. In the present disclosure, different directions are detected by using four different sensors, and tracking can be implemented only by controlling switching between the plurality of sensors. An automatic integrated closed-loop omni-directional monitoring cannot be really implemented, and the solution is excessively complex.

SUMMARY

1. Technical Problem to be Resolved

To resolve problems that an existing weld seam tracking laser vision sensor easily collides with a workpiece and has limitations in detecting complex curve weld seams, the present disclosure provides an omni-directional weld seam tracking laser vision sensor. A laser and at least three cameras are arranged around a welding gun, thereby reducing a system volume and avoiding a collision with a workpiece. A 360°-enclosed laser stripe image surrounding a working area of a welding gun can be collected in real time, and omni-directional detection on a weld seam with a complex path such as a curved weld seam and a 90°-deflection angle weld seam can be completed through image comparison. In a fully automatic welding process of the foregoing complex weld seam, it is unnecessary to pause the welding to adjust directions, thereby improving welding efficiency and quality.

2. Technical Solution

Objectives of the present disclosure are achieved by using the following technical solutions.

An aspect of the present disclosure provides an omni-directional weld seam tracking laser vision sensor, including a sensor housing and a mounting bracket arranged in the sensor housing. The sensor housing is a cylinder, a cylinder cover is arranged at one end of the cylinder, and a welding gun mounting hole is provided on the cylinder cover and is configured to sleeve a welding gun; and a filter is arranged at the other end of the cylinder, and a through hole is provided on the filter. During use, the welding gun is sleeved in the welding gun mounting hole, and a welding tip of the welding gun passes through the through hole in the filter, so that the sensor is sleeved over an outer circle of the welding gun.

A laser and at least three cameras are arranged on the mounting bracket, the cameras surround the welding gun mounting hole and are uniformly distributed in a peripheral direction, and the cameras are configured to capture a laser closed stripe image formed by a laser beam emitted by the laser. During use, a sensor has been sleeved in the welding gun, and the welding gun blocks both laser stripes formed by the laser beam emitted by the laser and a lens of the camera to some extent. In this case, a position of the laser needs to be adjusted, so that a laser stripe or a connection of a plurality of laser stripes formed on a surface of a workpiece by the laser beam emitted by the laser can form a closed stripe surrounding the working area of the welding gun, that is, the laser stripe can surround the working area of the welding gun in an omni-direction of 360° to form an enclosed curve. Therefore, after the welding gun completes current working, a weld seam intersects with the laser closed stripe when changing or bending to different angles, thereby implementing omni-directional detection on the weld seam.

The filter is located at a front end of the camera, the wavelength of the light allowed to be passed through is the same as the wavelength of the laser beam emitted by the laser. The filter may further be configured to block fumes and splashes generated in a welding process and filter out arc light interference.

An image processing module is further arranged in the cylinder, and the image processing module is connected to the camera and is configured to receive image information captured by the camera and to concatenate images captured by all cameras, to form an output including a complete laser closed stripe image. This is mainly because during actual use, it is difficult for each camera to capture a complete laser closed stripe image due to blocking of the welding gun. However, images captured by three cameras have an overlapping area, and the images captured by the cameras may be integrated by using an image processing algorithm, to obtain one image including a complete laser striped.

Further, the omni-directional weld seam tracking laser vision sensor further includes a cable, the cable includes a power line and a signal line, and the image processing module is connected to the camera through the signal line. The sensor supports a cable-free power supply and signal transmission manner, which may be adjusted according to an actual work scenario.

Further, a method for concatenating, by the image processing module by using an image concatenating algorithm, the images captured by all cameras includes: removing noise and discrete spots by using an image processing algorithm, and extracting pixel positions of incomplete stripes in all images. The stripes are concatenated according to the obtained pixel positions of the stripes. Preferably, a position with a minimum variance after concatenating is searched by using a least square method, to complete concatenating.

Preferably, the laser is a ring laser and emits an annular laser beam, and the ring laser surrounds the welding gun mounting hole by a circle.

In some embodiments, the laser may alternatively include three ring lasers that are spaced away from each other at an angle of 120° around a circumferential direction of the welding gun mounting hole and are distributed in a staggered manner with the camera. Positions and quantity of the lasers and a topography of the emitted laser stripes are suitable provided that the laser closed stripes surrounding a working area of the welding gun in 360° can be formed during use.

Preferably, the camera is a pinhole camera.

In some embodiments, the sensor is further provided with a dimming system.

According to a second aspect of the present disclosure, an omni-directional weld seam tracking welding apparatus is provided, including a welding gun, an information processing module, and an instruction execution mechanism, and further including the omni-directional weld seam tracking laser vision sensor according to the first aspect of the present disclosure. The welding gun is sleeved in the welding gun mounting hole and passes through a through hole, to sleeve with the weld seam tracking sensor.

The weld seam tracking sensor outputs a real-time laser closed stripe image surrounding a working area of the welding gun to an information processing module.

The information processing module analyzes according to the real-time laser closed stripe image to obtain information about a weld seam and a weld bead, generates a welding gun operation control instruction, and sends the welding gun operation control instruction to the instruction execution mechanism. A specific method includes: comparing the real-time laser closed stripe image with a reference laser closed stripe image, extracting a stripe deviation feature, and calculating to obtain the information about the weld seam and the weld bead, the reference laser closed stripe image being a laser closed stripe image formed by a laser beam emitted by the laser on a flat panel without a weld seam.

The instruction execution mechanism receives a control instruction sent by the information processing module and controls, according to the instruction, the welding gun to complete welding work.

According to a third aspect of the present disclosure, an omni-directional weld seam tracking laser vision sensing method is further provided, applied to the omni-directional weld seam tracking welding apparatus according to the second aspect of the present disclosure, and including the following steps:

step S1: scanning a flat panel by using an omni-directional weld seam tracking laser vision sensor sleeved with a welding gun, a specific method including: placing the flat panel right below the omni-directional weld seam tracking laser vision sensor sleeved with the welding gun, emitting, by the laser, a laser beam to a surface of the flat panel, and adjusting a position of the laser form a laser stripe, to enable one laser stripe or a connection of a plurality of laser stripes to surround a projection area of the welding gun on the flat panel to form a laser closed stripe;

step S2: outputting, by an image processing module, a laser closed stripe image on the flat panel to an information processing module as a reference laser closed stripe image;

step S3: scanning, by the omni-directional weld seam tracking laser vision sensor sleeved with the welding gun, a to-be-welded workpiece in real time, a laser closed stripe surrounding a working area of the welding gun and intersecting with a weld seam, and outputting, by the image processing module, a real-time laser closed stripe image to the information processing module;

step S4: comparing, by the information processing module, the reference laser closed stripe image with the real-time laser closed stripe image, and extracting a stripe deviation feature to obtain information about the weld seam and a weld bead for generating a welding gun operation control instruction; and repeating step S3 and step S4 until welding is completed.

Preferably, before outputting the laser closed stripe image by the image processing module, the method further includes a step of searching an intersection point of laser stripes to obtain an outer circle contour of the laser closed stripe, and the output laser closed stripe image only includes the outer circle contour.

Further, the information about the weld seam and the weld bead obtained by the information processing module includes information about the weld seam after welding is completed.

3. Beneficial Effect

Compared with an existing technology, the present disclosure has the following advantages:

1. A laser sensor of the omni-directional weld seam tracking laser vision sensor cooperates with at least three cameras, and the emitted laser beam forms the laser closed stripe, to form a 360° omni-directional enclosed curve surrounding the working area of the welding gun, and various types of complex weld seams intersect with the laser closed stripe when turning in any direction, thereby eliminating a detection blind area when a direction of the weld seam suddenly changes. In addition, information of a complete laser closed stripe is collected through at least three cameras, and the laser closed stripe image obtained after concatenating can implement omni-directional real-time tracking and detection on the weld seam, that is, detection can be performed in time even for complex spatial weld seams such as a weld seam with a bent path, a 90°-deflection angle weld seam, an orientation of the weld seam can be determined without rotating the direction of the welding gun by using a robotic arm, continuous welding is implemented, and a situation that welding has to be stopped in a process of adjusting the welding gun and the sensor is avoided, thereby improving welding quality.
2. Compared with an existing weld seam tracking sensing apparatus and detection method, the omni-directional weld seam tracking laser vision sensor of the present disclosure adopts a cylindrical structure, is sleeved over a welding gun during use, is in a close surrounding connection relationship with the welding gun, and synchronously moves with the welding gun during operation of the welding gun, thereby avoiding collision between the laser sensor and a workpiece.
3. The sensor adopts at least three pinhole cameras and a ring laser, has a compact structure, and surrounds the welding gun. An overall volume of the system is small, and is applicable to a welding operation of a software welding gun in a narrow space.
4. In the omni-directional weld beam tracking laser vision sensing method of the present disclosure, the images captured by different cameras are concatenated by using an image processing algorithm, the information about the weld seam and the weld bead is calculated by continuously comparing the reference laser closed stripe image and the real-time laser closed stripe image, so that the orientation of the weld seam can be predetermined, thereby implementing more accurate automatic welding control by further combining operation speed of the welding gun.

Figure 1:
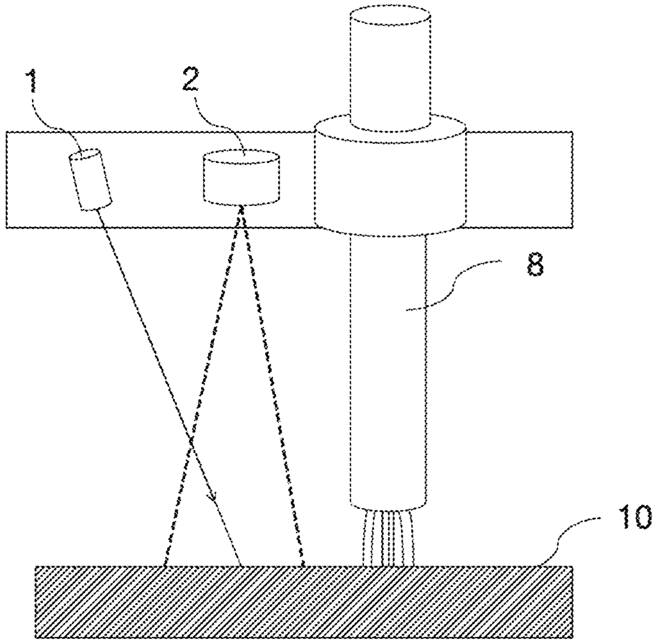
FIG. 1 is a schematic diagram of an application scenario of a weld seam tracking sensing apparatus in an existing technology.

Reference signs in the drawings: 1, laser; 2, camera; 3, filter; 31, through hole; 4, cable; 5, sensor housing; 51, welding gun mounting hole; 6, mounting bracket; 7, image processing module; 8, welding gun; 9, hose clamp; 10, workpiece 1; 11, workpiece 2; 12, area P1; 13, area P2; 14, area P3; 15, 90°-deflection angle weld seam; 16, horizontal base plate; and 17, image processing algorithm.

DETAILED DESCRIPTION

The following describes the present disclosure in detail with reference to accompanying drawings of the specification and specific embodiments.

Related concepts involved in the present disclosure are explained below:

Weld seam: in the document of this application, a weld seam refers to a predetermined area connecting two or more workpieces after a welding gun welds.

A weld seam tracking system is configured for an automatic welding scenario of an industrial robot or a special welding machine.

Workpiece: a workpiece in the document of this application refers to a base metal preset with a weld seam.

Flat panel: a flat panel is a flat base plate that does not have a weld seam. When a laser beam of a laser scans across a surface of the flat panel, a laser ripple is a regular pattern corresponding to the laser.

Welding gun: a welding gun referred to in the context of the present disclosure may be an arc welding gun, or may be another welding gun satisfying an automatic welding application scenario, such as a laser welding gun, an ultrasonic welding gun, a resistance welding gun, a plasma welding gun, or an electron beam welding gun with forms and specifications meeting requirements.

Camera: a camera is configured to obtain image information, and may be optical cameras of various types. A collected image may be a captured picture or may be obtained by selecting a video frame from a video stream. The collected image is preferably a digital signal, or may be an analog signal converted into a digital signal.

Filter: a filter allows a wavelength of passed light to be consistent with a wavelength of a laser beam emitted by a laser, and is configured to filter out arc light interference in a welding process and block fumes and splashes generated in a welding process.

Image processing module: an image processing module includes a memory and a processor. The processor may execute image recognition and processing algorithms, to complete tasks such as stripe image concatenating, closed contour recognition, and stripe image comparison.

Laser: a laser is a device that emits a highly concentrated light beam.

As recorded in Chinese Patent Application No. CN 107020449 A, referring to FIG. 1, during working of a conventional welding gun, a weld seam tracking sensor and a welding gun are arranged on a welding execution mechanism, for example, a robot or a welding trolley. The sensor is located at a distance in front of the welding gun. During welding, the sensor transmits observed weld seam information to a computer or another mobile terminal, and obtains a weld seam trajectory after processing. The computer or the mobile terminal may query a distance by which the welding gun deviates from the weld seam in real time, so as to control the execution mechanism to adjust a position of the welding gun, thereby tracking the weld seam. The method is applicable to an operation of long and straight weld seam, and has many limitations for complex curves.

According to the omni-directional weld seam tracking laser vision sensor and the weld seam detection method provided in the present disclosure, in a process of tracking a weld seam, all possible directions in which a welding gun advances may be detected, to complete continuous tracking of the weld seam whose trajectory is a complex curve, thereby implementing uninterrupted welding.

Embodiment 1

Figure 2:
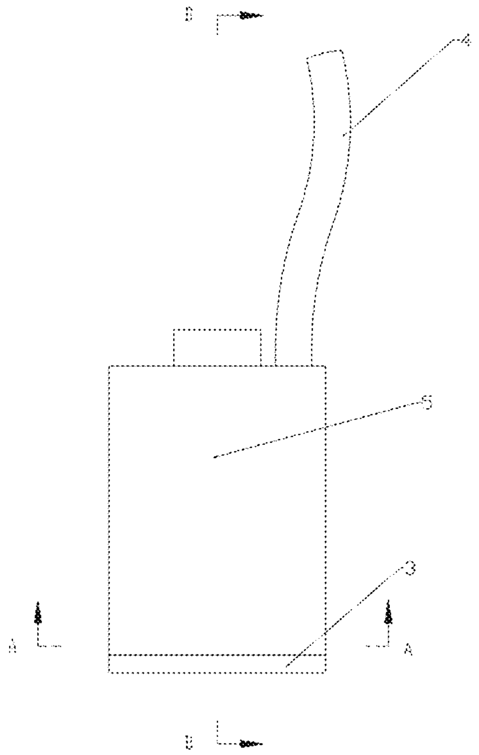
FIG. 2 is a schematic structural diagram of an omni-directional weld seam tracking laser vision sensor.

As shown in FIG. 2, an aspect of this embodiment of this specification provides an omni-directional weld seam tracking laser vision sensor, including a laser 1, at least three cameras 2, a filter 3, a cable 4, and a sensor housing 5; and a mounting bracket 6 and an image processing module 7 are arranged in the sensor housing 5.

The sensor housing 5 is a cylinder, a cylinder cover is arranged at one end of the cylinder, and a welding gun mounting hole 51 is provided on the cylinder cover and is configured to sleeve a welding gun 8; and the filter 3 is arranged at the other end of the cylinder, and a through hole 31 is provided on the filter 3. During use, the welding gun 8 is sleeved in the welding gun mounting hole 51, and a welding tip of the welding gun 8 passes through the through hole 31 in the filter 3, so that the sensor is sleeved over an outer circle of the welding gun.

The sensor is sleeved over the welding gun 8, so that the sensor closely surrounds the welding gun 8 and moves with the working welding gun 8, thereby avoiding collision between the welding gun 8 and the sensor. In some embodiments, a positional relationship between the welding gun 8 and the sensor is not limited to sleeving, and the sensor may alternatively be independently arranged outside. For example, the laser or the sensor may alternatively be placed on a desk, and this objective is achieved by using a reflection apparatus on the welding gun 8. However, this is high in costs, and can only be applied in an ideal case.

The laser 1 and the camera 2 are arranged on the mounting bracket in the sensor housing 5. In some other embodiments, the laser 1 and the camera 2 may alternatively be mounted on a surface of the sensor housing 5, and are distributed around a peripheral direction of the welding gun mounting hole 51. When a laser beam emitted by the at least one laser 1 is projected on a surface of a workpiece, one or more laser stripes intersect and connect to enclose and surround a working area of the welding gun 8 by a circle to form a closed curve, thereby obtaining a laser closed stripe. As shown by a small curved intermittent gap on a left side in FIG. 15, in an actual application, it is verified through experiments that because of impacts of a design, a process, and on-site adjustment, it is difficult to completely enclose the laser beam emitted by the laser. In this case, the extent of enclosing and surrounding can meet an actual requirement on tracking a weld seam. The camera 2 is configured to collect a laser closed stripe image formed by a laser stripe.

Types, quantities, and mounting positions of the laser 1 and the camera 2 are not limited. The laser may alternatively be a laser emitting straight lines or other laser stripes. It can be theoretically satisfied that the laser stripes emitted by the some or all of the lasers 1 can separately or be connected to complete enclosing and surrounding around a periphery of the welding gun. Between the laser 1 and the camera 2, it is satisfied that after cooperation of the laser emitting a laser beam and the camera 2 collecting an image, a weld seam in a direction and a position in which the welding gun 8 may move can be detected.

The image processing module 7 is connected to the camera 2 by using the cable 4, receives image information collected by the camera 2, and completes image processing, to generate an image including a closed loop formed by a complete laser stripe, thereby further completing closed contour recognition and stripe image comparison. In some embodiments, the image processing module 7 may alternatively be connected to the camera 2 in a wireless manner, as long as timely transmission of the image information can be completed.

The filter 3 is mounted at a front end of the camera 2, and is configured to block fumes and splashes generated in a welding process and filter out arc light interference. Preferably, three lasers 1 are arranged and are uniformly distributed around a peripheral direction of the welding gun mounting hole at intervals of 120°. Preferably, the laser 1 is a ring laser and emits an annular laser beam. Three cameras 2 surround the peripheral direction of the welding gun mounting hole and are arranged in a staggered manner with the laser.

Preferably, for the camera 2, a pinhole camera having a relatively small volume is considered. In this way, the size of the sensor can be further compressed, thereby facilitating cooperation with a soft welding gun and entering a narrow space to work. Other video cameras and cameras meeting application scenario volumes and performance requirements may alternatively be considered.

Preferably, the filter 3 is a band-pass filter to allow a wavelength of passed light to be consistent with a wavelength of a laser beam emitted by the laser.

Further, a material of the filter is glass. Alternatively, another material meeting light filtering and scenario adaptation requirements may be selected, for example, a resin material.

Further, the cable 4 includes a signal line and a power line.

Further, in some embodiments, a sensing device further includes a dimming film, configured to reduce an input amount of light and filter out intense arc light in a welding process.

Figure 3:
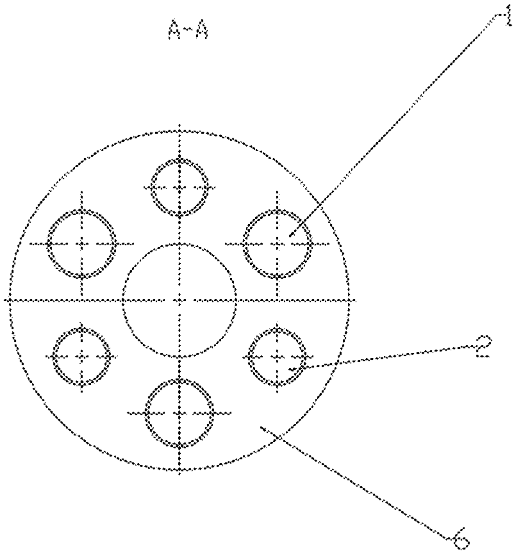
FIG. 3 is an A-A cross-sectional view of an omni-directional weld seam tracking laser vision sensor.
Figure 4:
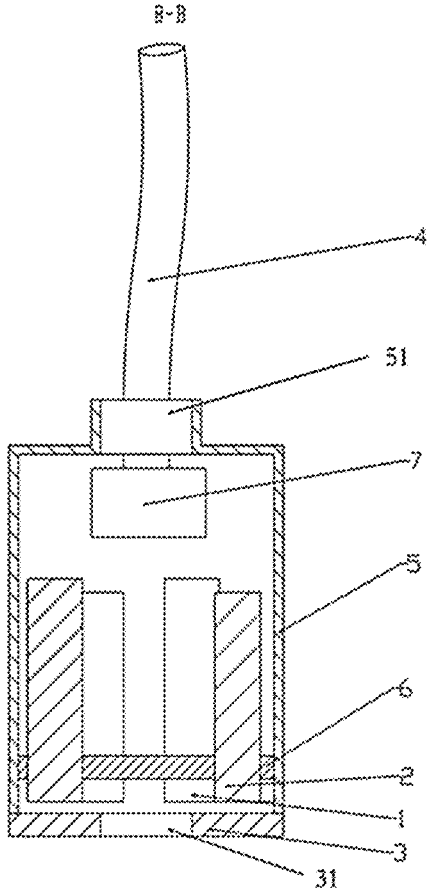
FIG. 4 is a B-B cross-sectional view of an omni-directional weld seam tracking laser vision sensor.

As shown in FIG. 2 to FIG. 4, a specific embodiment of the present disclosure is as follows: the sensor includes three ring lasers 1, three pinhole cameras 2, a band-pass filter 3, a cable 4, a sensor housing 5, a mounting bracket 6, and an image processing module 7.

The overall sensor has a cylindrical topography, and is sleeved outside the welding gun 8 for use; and the sensor housing 5 is correspondingly a device housing.

As shown in FIG. 3, the laser 1 is arranged inside the sensor housing 5, three lasers 1 are arranged around the welding gun 8 in a peripheral direction, and two adjacent lasers are spaced at an interval of 120°. Because the annular laser beam emitted by the ring laser cannot be completely projected on a surface of the workpiece due to blocking of a welding tip of the welding gun 8, positions of the three lasers 1 need to be adjusted to cooperate and stagger to form a closed loop.

The three pinhole cameras 2 are arranged inside the sensor housing 5, and are annularly arranged in a staggered manner with the three lasers 1 around the position of the welding gun at a front end of the sensor, and two adjacent cameras 2 are spaced at an interval of 120°. Similarly, a single camera 2 cannot capture a complete annular laser stripe topography due to blocking of the welding tip of the welding gun 8. Therefore, images captured by the three cameras 2 need to be concatenated into a complete image.

The band-pass filter 3 allows the wavelength of the passed light to be consistent with the wavelength of the laser beam emitted by the laser. The band-pass filter 3 is fixed on a mounting bracket 6 at a front end of the sensor housing 5, and is configured to block fumes and splashes generated in a welding process, and filter out arc light interference. A dimming filter is further arranged in front of the filter made of glass, and is configured to reduce an input amount of light.

Due to a limitation of hardware, in this embodiment, three single-point emitting lasers emit annular laser stripes to form a closed loop, and a single ring laser is not used. The single ring laser is applicable when device processes are met.

Embodiment 2

According to a second aspect of the present disclosure, an omni-directional weld seam tracking welding apparatus is provided, including a welding gun 8, an information processing module, and an instruction execution mechanism, and further including the omni-directional weld seam tracking laser vision sensor according to the first aspect of the present disclosure. A welding gun 8 is sleeved in a welding gun mounting hole 51 and passes through a through hole 31, to sleeve with the weld seam tracking sensor.

The weld seam tracking sensor outputs a real-time laser closed stripe image surrounding a working area of the welding gun to an information processing module.

The information processing module analyzes according to the real-time laser closed stripe image to obtain information about a weld seam and a weld bead, generates a welding gun operation control instruction, and sends the welding gun operation control instruction to the instruction execution mechanism. A specific method includes: comparing the real-time laser closed stripe image with a reference laser closed stripe image, extracting a stripe deviation feature, and calculating to obtain the information about the weld seam and the weld bead, the reference laser closed stripe image being a laser closed stripe image formed by a laser beam emitted by the laser on a flat panel without a weld seam.

The instruction execution mechanism receives a control instruction sent by the information processing module and controls, according to the instruction, the welding gun to complete welding work.

Figure 5:
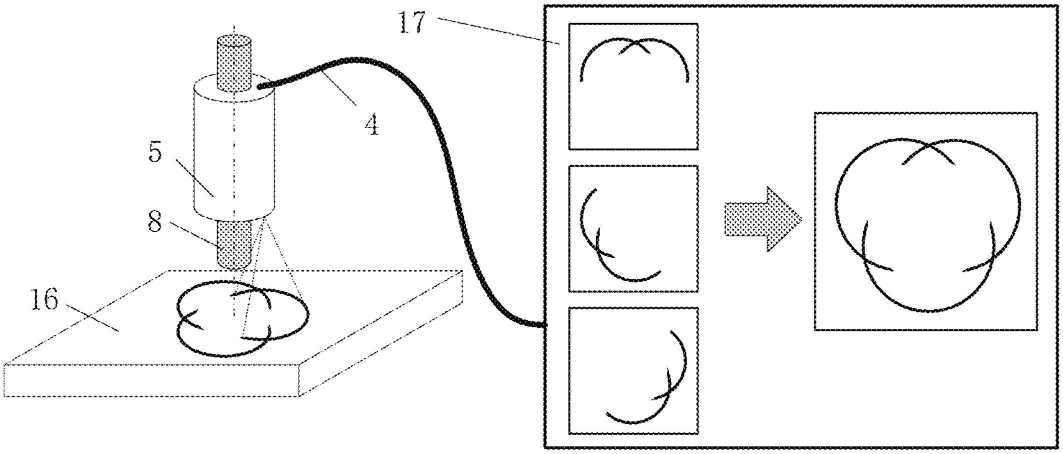
FIG. 5 is a schematic diagram of emitting of a laser and image concatenating of a camera.

FIG. 5 shows a specific embodiment of a welding apparatus using an omni-directional weld seam tracking laser vision sensor. The sensor in Embodiment 1 is sleeved outside the welding gun 8 for use. A welding tip of a welding gun 8 blocks an action area of the single laser 1. Positions of the lasers 1 are adjusted, so that laser beams emitted by the lasers 1 can adjacently intersect in pairs and connect into a closed loop on a horizontal base plate 16, to obtain a laser closed stripe. In addition, due to existence of the welding gun 8, a single camera 2 cannot obtain a complete stripe image either. Images detected by the three cameras 2 need to be synthesized in the image processing module 7 through an image processing algorithm 17, and feature information needs to be extracted. In a welding process, the image processing algorithm 17 in the image processing module 7 processes a real-time image obtained by the camera 2 to complete concatenating of the stripe image, further searches for an intersection point of the annular stripes to obtain a closed peripheral contour, and then obtains, through comparison of the stripe images, information about the tracked weld seam and outputs the information about the tracked weld seam to a welding gun control system, for detecting the weld seam and controlling the welding gun.

Embodiment 3

Figure 6:
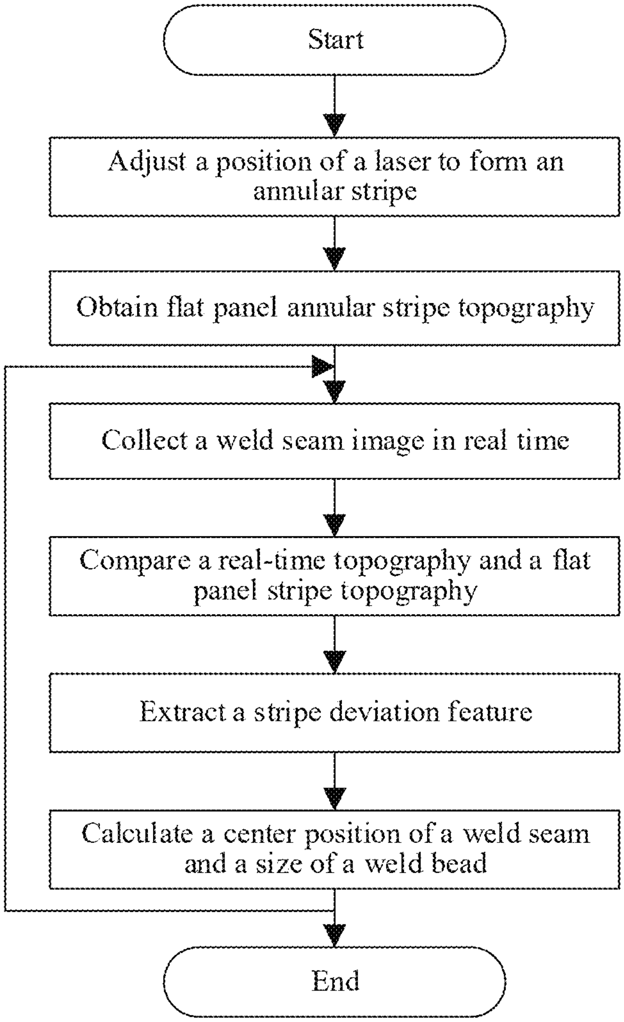
FIG. 6 is a flowchart of an omni-directional weld seam tracking laser vision sensing method.

As shown in FIG. 6, the present disclosure further provides an omni-directional weld seam tracking laser vision sensing method, applied to the omni-directional weld seam tracking welding apparatus according to the second aspect of the present disclosure. The method includes the following steps:

Step S1: Adjust a position of a laser 1 to form a laser closed stripe: scanning a flat panel by using an omni-directional weld seam tracking laser vision sensor sleeved with a welding gun, where a specific method includes: placing the flat panel right below the omni-directional weld seam tracking laser vision sensor sleeved with the welding gun, emitting, by the laser, a laser beam to a surface of the flat panel, and adjusting a position of the laser form a laser stripe, to enable one laser stripe or a connection of a plurality of laser stripes to surround a projection area of the welding gun on the flat panel to form a laser closed stripe.

Optionally, a ring laser that can be mounted around a welding gun mounting hole 51 by a circle is arranged in the apparatus, and the emitted laser stripes may form an annular closed stripe around a working area of the welding gun 8; or at least two lasers 1 are provided, and laser beams emitted by some or all of the lasers 1 intersect and connect to form a laser closed stripe around the welding gun. Preferably, the laser is a ring laser. In some embodiments, there are three lasers 1.

Step S2: Obtain a reference laser closed stripe image: outputting, by an image processing module, a laser closed stripe image on the flat panel to an information processing module as a reference laser closed stripe image.

Specifically, the camera 2 collects an original image of the laser closed stripe formed on the flat panel by the laser 1 in step S1, and the camera 2 sends the collected original image to the image processing module 7 through a signal line in a cable 4; and the image processing module 7 receives the original image, and completes image processing, to obtain a reference laser closed stripe image including a complete laser stripe.

Optionally, the three cameras 2 respectively collect local images, and an image including a complete laser closed stripe may be generated after some or all of the local images are concatenated. In some embodiments of the present disclosure, a filter is arranged at a front end of a lens of the camera. The filter is configured to filter out interference light during working. Preferably, a dimming part is further arranged at a front end of the filter, to reduce an input amount of light.

In some embodiments of the present disclosure, the image processing module obtains the image including the complete laser closed stripe by concatenating the local images. Further, during concatenating, the image processing module searches for an intersection point of the laser stripes and obtains an outer circle contour of the laser closed stripe, thereby facilitating comparison in subsequent steps.

In this embodiment, there are two key components inside the sensor. One is a laser emitter for emitting laser stripes, and a focus point is a focal plane of a laser beam. The other is a camera for capturing a stripe image, and a focus point is a focal length of the camera. Oblique incidence may generate graphic distortion and sensor shooting distortion, but may be corrected through an accurate image processing algorithm. Therefore, ranges of distances and angles between the flat panel and a workpiece and between the flat panel and the sensor are not limited, but oblique incidence does not exceed an allowed range of a focal plane of the laser beam. For example, the laser obliquely emits the flat panel, and if a circle close to the laser is on the focal plane, the laser stripe becomes wider because a far end of the circle is far away from the focal plane.

Due to assembly errors, it is difficult to unify the distances from different laser emitters to the flat panel. An actually obtained image is not an ideal and regular closed loop. In this case, a process of obtaining a flat panel reference laser closed stripe image is necessary, if position and size information of the laser closed stripe on the flat panel and a mapping relationship of blocking are calculated in advance. Step S2 may be omitted in an ideal state, and subsequent comparison may be performed based on a real-time image and calculation data. Currently, an algorithm with step S2 retained is suitable for an actual application.

Step S3: Collect a laser closed stripe image of a weld seam of a to-be-welded workpiece in real time: scanning, by the omni-directional weld seam tracking laser vision sensor sleeved with the welding gun, a to-be-welded workpiece in real time, a laser closed stripe surrounding a working area of the welding gun and intersecting with a weld seam, and outputting, by the image processing module, a real-time laser closed stripe image to the information processing module.

Specifically, by using the same method as step S2, the omni-directional weld seam tracking laser vision sensor is used to scan the to-be-welded workpiece with a weld seam in real time, to obtain the real-time laser closed stripe image. Preferably, the outer circle contour of the real-time laser closed stripe image may be obtained by using the same method described in S2.

Step S4: The information processing module compares the reference laser closed stripe image with the real-time laser closed stripe image, and extracts a stripe deviation feature to obtain information about the weld seam and a weld bead for generating a welding gun operation control instruction. Specifically, the information processing module calculates a center position of the weld seam and/or a size of the weld bead according to a feature of a stripe deviation.

The foregoing step S3 and step S4 are repeated until welding is ended. In a specific embodiment of the present disclosure, the image processing module concatenates local images of the laser stripes that are formed by the laser beams emitted by the ring lasers 1 and are respectively captured by the three pinhole cameras 2, to form a complete topography of the laser closed stripe.

Further, a method for concatenating, by the image processing module 7 by using an image concatenating algorithm 17, the images captured by all cameras includes: removing noise and discrete spots by using the image processing algorithm 17, and extracting pixel positions of incomplete stripes in all images. The stripes are concatenated according to the obtained pixel positions of the stripes. Preferably, a position with a minimum variance after concatenating is searched by using a least square method, to complete concatenating.

Figure 7:
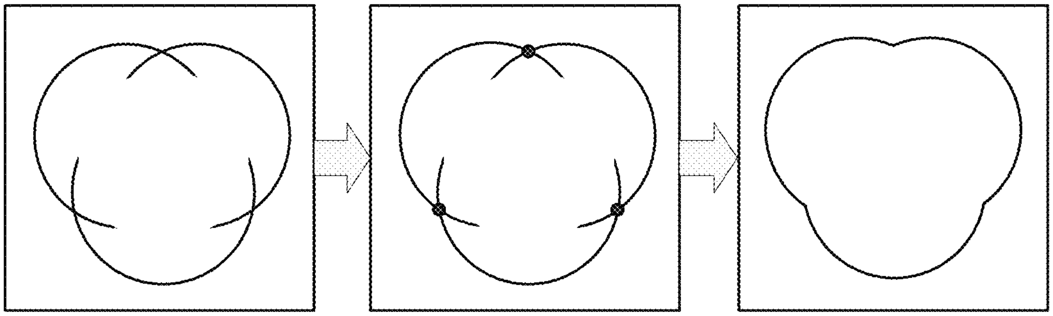
FIG. 7 is a schematic diagram of an effect of an image processing algorithm.

Preferably, for facilitating comparison, the image processing module 7 applies the image processing algorithm 17 to find an intersection point of three annular laser stripes, to obtain a stripe closed contour, as shown in FIG. 7. The stripe image obtained in real time is compared with the stripe image obtained on the flat panel, so that omni-directional weld seam center position recognition can be implemented.

Figure 8:
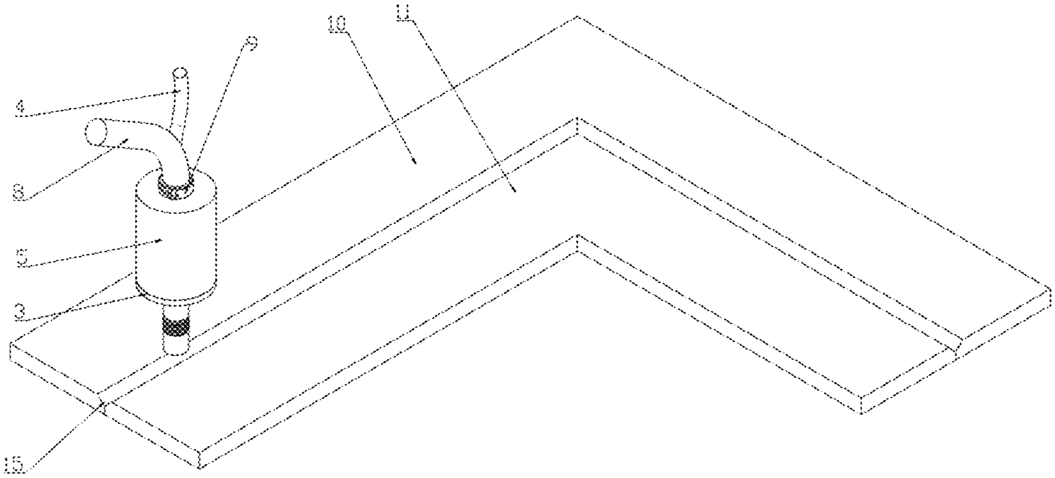
FIG. 8 is a schematic diagram of a working condition of a 90° folded-line weld seam.

A specific embodiment of a process of performing automatic welding by the omni-directional weld seam tracking welding apparatus of Embodiment 2 of the present disclosure by using the omni-directional weld seam tracking laser vision sensing method is shown in FIG. 8, and includes the following steps:

the information processing module analyzes to obtain weld seam trajectory information, generates an instruction for adjusting a working state of a welding gun 8, and sends the instruction to an instruction execution mechanism, and the instruction execution mechanism controls the welding gun 8 to work.

In FIG. 8, a 90°-deflection angle weld seam 15 is provided between a workpiece 1 10 and a workpiece 2 11, the welding gun 8 is sleeved in a sensor housing 5, a hose clamp 9 is configured to fix the welding gun 8, a band-pass glass filter 3 is arranged at a position where the sensor housing 5 is close a welding tip of the welding gun, and a cable 4 is configured to transmit image information obtained by a sensing detection apparatus to the image processing module 7. The weld seam tracking sensor and the sensing method using an annular laser beam are applied to tracking a 90°-deflection angle weld seam, where the weld seam may be divided into three areas: an area P1 12, an area P2 13, and an area P3 14.

Figure 10:
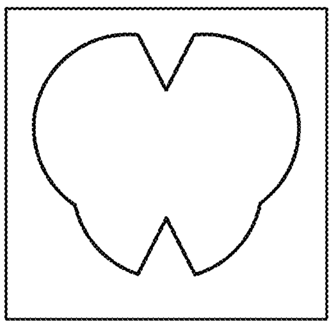
FIG. 10 is an image obtained by a sensor when a weld seam in an area P1 is not welded.
Figure 11:
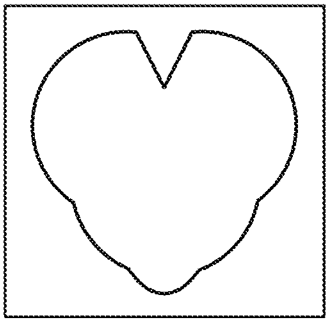
FIG. 11 is an image obtained by a sensor in a process of welding a weld seam in an area P1.

The area P1 12 is a long and straight weld seam, and a stripe topography before welding is shown in FIG. 10. Compared with a reference laser closed stripe image in FIG. 7 obtained at a position of the flat panel, two gaps corresponding to unwelded weld seams appear at an upper end and a lower end of the laser closed stripe image in FIG. 10 corresponding to a front direction and a rear direction of the welding gun, which indicates that there are unwelded weld seams at the front direction and the rear direction of the welding gun. In this case, the welding gun 8 starts working. A topography in a welding process is shown in FIG. 11. At an upper end of the closed loop in the image, corresponding to the front of the welding gun 8, a concave gap corresponding to an unwelded weld seam is still presented. At a lower end of the closed loop in the image, corresponding to the rear of the welding gun, a welded protrusion is presented, which indicates that the weld seam at the rear part of the welding gun has been welded. The sensor is mainly responsible for tracking a position of an unwelded front section. This objective may be achieved by calculating an image position, and a completed part may be used for evaluating welding quality.

Figure 9:
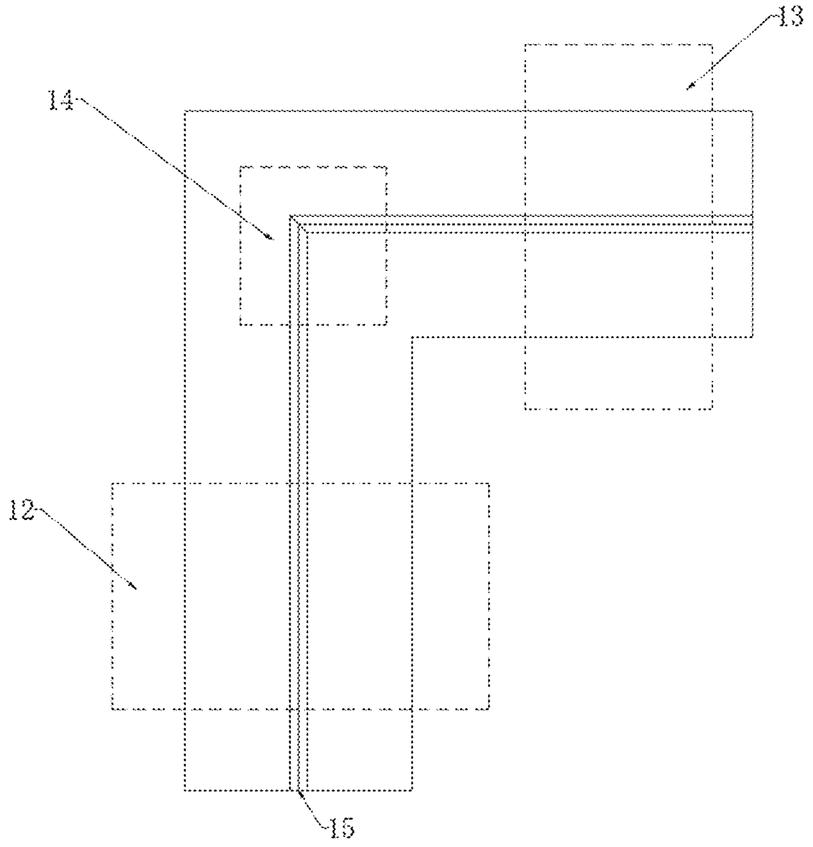
FIG. 9 is a schematic diagram of different weld seam areas.
Figure 12:
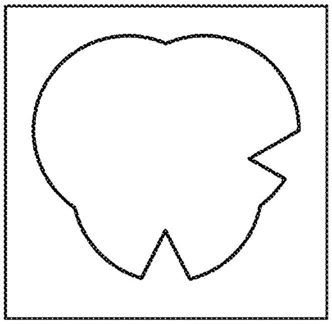
FIG. 12 is an image obtained by a sensor when a weld seam in an area P3 is not welded.
Figure 13:
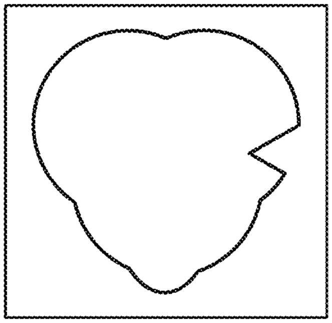
FIG. 13 is an image obtained by a sensor in a process of welding a weld seam in an area P3.

A stripe topography of the area P3 14 before welding is shown in FIG. 12. A closed loop stripe image in the figure is compared with an original image obtained at the position of the flat plate position in FIG. 6. Similarly, it can be learned that an unwelded weld seam exists at a lower side and a right side of the welding gun, and a 90°-deflection angle occurs on the weld seam. A topography of the area P3 14 in a welding process is shown in FIG. 13. The lower end is welded, and the welding gun continues to weld to the right side after completes welding of the lower end. Actually, there is a distance between the two detected gaps in the image and a position of a middle wire of the welding gun, and there is a blind area. Whether the weld seam in FIG. 9 reaches an inflection point is not known only by using information of a protrusion at a lower part of FIG. 13, and information when reaching the inflection point is detected in the area P1 12 and recorded by the sensor. Specifically, when the sensor works in the area P1 12, and an upper edge of the stripe is just in contact with the inflection point, the upper edge of the stripe image changes. In this case, a vertical weld seam has not been completed. The execution mechanism obtains a delay time by dividing a distance between the upper edge of the stripe and a center of the welding gun by a welding speed. After waiting the delay time, the welding gun 8 reaches the inflection point position. In this case, a gap of the area P3 14 appears directly to the right of the welding gun 8. When the execution mechanism moves within the delay time, the right gap corresponding to the stripe gradually transitions from the upper right to the right side. That is, a direction in which the welding gun walks after the center of the welding gun reaches the inflection point is to be determined according to a change state of the stripe within the delay time. In this case, the welding gun directly walks to the right.

In this case, because the tracking sensor implements omni-directional detection of the weld seam. When a 90°-deflection angle occurs on the weld seam, steerable continuous welding can be implemented without stopping welding or rotating the welding gun 8.

Figure 14:
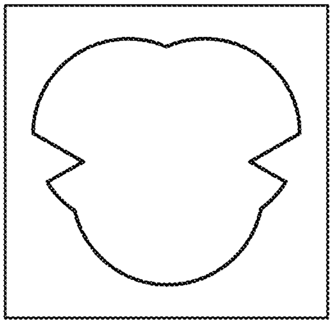
FIG. 14 is an image obtained by a sensor when a weld seam in an area P2 is not welded.
Figure 15:
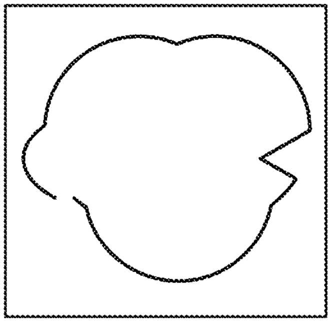
FIG. 15 is an image obtained by a sensor in a process of welding a weld seam in an area P2.

After the welding in the area P1 12 and the area P3 14 is completed, the welding gun 8 can continuously weld to the area P2 13 without interrupting. A stripe topography of the area P2 13 before welding is shown in FIG. 14. Similar to analysis of the area P1 12 and the area P3 14, there are unwelded weld seams in a left direction and a right direction of the welding gun 8. In this case, the welding gun 8 is advanced in a left-right direction, and a topography in a welding process is shown in FIG. 15. A left side has been welded, and a right side is a direction of a to-be-welded weld seam. In this case, it is observed that in the detected image of the welded area, due to blocking of the welding gun, a small gap occurs in the image that needs to be closed. Further, in an actual mounting, debugging, and use process of the device, a complete closed loop cannot be presented consistently due to a realistic condition, as long as that completion of a welding task is not affected. It can be learned that by comparing the foregoing different stripe images with the original image in FIG. 7 obtained at the position of the flat panel, the control system may determine three-dimensional topography information of a current detection position. During detection, omni-directional weld seam tracking can be implemented without rotating the welding gun 8 and the sensor. In addition, when the welding gun 8 operates to a turning position in the area P3 14, the welding direction may alternatively be changed immediately, and a vision blind area does not exist. Therefore, the sensor and the detection method of the present disclosure can implement omni-directional real-time detection of a weld seam.

Meanwhile, images before and after welding may be compared to obtain a net formed contour of a current weld bead, and height and width information of a weld bead may be obtained by using a solution recorded in Chinese Patent Application No. CN 116973540 A.

The detection method of the omni-directional weld seam tracking laser vision sensor using an annular laser stripe can be applied to omni-directional tracking and detection of a weld seam with a complex spatial curve, and a direction of a welding gun does not need to be adjusted by a robotic arm in an automatic welding process. In addition, the detection apparatus disclosed in the present disclosure has a compact structure and is applicable to a narrow space. Therefore, the apparatus is further applicable to size detection of arc additive forming in a narrow space. Based on the detection method of the present disclosure, the net formed contour of an actual deposition may further be obtained by further expanding and comparing topographies before and after forming. A specific method has exceeded the scope of the present disclosure, and details are not described herein again.

Creation of the present disclosure and implementations thereof are schematically described above. This description is not intended to be limiting. The present disclosure can be implemented in other specific forms without departing from the spirit or basic characteristics of the present disclosure. What is shown in the accompanying drawings is only one implementation of the present disclosure, and an actual structure is not limited thereto. Any reference sign in the claims does not limit the claims involved. Therefore, if a person of ordinary skill in the art is inspired by the present disclosure, a structural manner and an embodiment similar to the technical solution without creative design without departing from the spirit of the present disclosure all fall within the protection scope of this application. In addition, the word "including" does not exclude other elements or steps, and the word "a" before an element does not exclude "a plurality of" the elements. A plurality of elements stated in the product claims may alternatively be implemented by one element by using software or hardware. Words such as a step name, first, and second are only used for representing names, and do not represent any specific sequence.

What is claimed is:

1. An omni-directional weld seam tracking laser vision sensor, comprising a sensor housing (5) and a mounting bracket (6) arranged in the sensor housing (5), wherein the sensor housing (5) is a cylinder, a cylinder cover is arranged at one end of the cylinder, and a welding gun mounting hole (51) is provided on the cylinder cover and is configured to sleeve a welding gun; a filter (3) is arranged at the other end of the cylinder, and a through hole (31) is provided on the filter (3);

a laser (1) and at least three cameras (2) are arranged on the mounting bracket (6), the laser (1) comprises three ring lasers that are spaced away from each other at an angle of 120° in the circumferential direction of the welding gun mounting hole (51) and are distributed in a staggered manner with the camera (2), so that the connection of a plurality of laser stripes formed on a surface of a workpiece by the laser beam emitted by the laser can form a closed stripe surrounding the working area of the welding gun, that is, the laser stripe can surround the working area of the welding gun in an omni-direction of 360° to form an enclosed curve;

the cameras (2) surround the welding gun mounting hole and are uniformly distributed in a peripheral direction, the cameras (2) are configured to capture a laser closed stripe image formed by a laser beam emitted by the laser (1), and images captured by multiple cameras have an overlapping area, so that the images captured by each camera can be integrated by using an image processing algorithm to obtain one image including a complete laser striped;

the filter (3) is located at the front end of the camera (2), the wavelength of the light allowed to be passed through is the same as the wavelength of the laser beam emitted by the laser (1); and an image processing module (7) is further arranged in the cylinder, and the image processing module (7) is connected to the camera (2) and is configured to receive image information captured by the camera (2) and to concatenate images captured by all cameras (2), to form an output comprising a complete laser closed stripe image.

2. The omni-directional weld seam tracking laser vision sensor according to claim 1, wherein concatenating, by the image processing module (7), the images captured by all cameras (2) comprises: removing noise and discrete spots by using an image processing algorithm (17), and extracting pixel positions of incomplete stripes in all images; and concatenating the stripes according to the obtained pixel positions of the stripes, and searching a position with a minimum variance after concatenating by using a least square method.

3. The omni-directional weld seam tracking laser vision sensor according to claim 1, further comprising a cable (4), wherein the cable (4) comprises a power line and a signal line, and the image processing module (7) is connected to the camera (2) through the signal line.

4. An omni-directional weld seam tracking welding apparatus, comprising a welding gun (8), an information processing module, and an instruction execution mechanism, and further comprising the omni-directional weld seam tracking laser vision sensor according to claim 1, wherein the welding gun (8) is sleeved in a welding gun mounting hole (51) and passes through a through hole (31), to sleeve with the weld seam tracking sensor;

the weld seam tracking sensor outputs a real-time laser closed stripe image surrounding a working area of the welding gun to an information processing module;

the information processing module analyzes according to the real-time laser closed stripe image to obtain information about a weld seam and a weld bead, generates a welding gun operation control instruction, and sends the welding gun operation control instruction to the instruction execution mechanism; and the instruction execution mechanism receives a control instruction sent by the information processing module and controls, according to the instruction, the welding gun (8) to complete welding work.

5. The omni-directional weld seam tracking welding apparatus according to claim 4, wherein analyzing, by the information processing module, to obtain the information about the weld seam and the weld bead comprises: comparing the real-time laser closed stripe image with a reference laser closed stripe image, extracting a stripe deviation feature, and calculating to obtain the information about the weld seam and the weld bead, the reference laser closed stripe image being a laser closed stripe image formed by a laser beam emitted by the laser (1) on a flat panel without a weld seam.

6. An omni-directional weld seam tracking laser vision sensing method, applied to the omni-directional weld seam tracking welding apparatus according to claim 4, and comprising the following steps:

step S1: scanning a flat panel by using an omni-directional weld seam tracking laser vision sensor sleeved with a welding gun, a specific method comprising: placing the flat panel right below the omni-directional weld seam tracking laser vision sensor sleeved with the welding gun, emitting, by the laser, a laser beam to a surface of the flat panel, and adjusting a position of the laser form a laser stripe, to enable one or a plurality of laser stripes to form a connection on the flat panel to surround a laser closed stripe of the welding gun;

step S2: outputting, by an image processing module (7), a laser closed stripe image on the flat panel to an information processing module as a reference laser closed stripe image;

step S3: scanning, by the omni-directional weld seam tracking laser vision sensor sleeved with the welding gun, a to-be-welded workpiece in real time, a laser closed stripe surrounding a working area of the welding gun and intersecting with a weld seam, and outputting, by the image processing module (7), a real-time laser closed stripe image to the information processing module;

step S4: comparing, by the information processing module, the reference laser closed stripe image with the real-time laser closed stripe image, and extracting a stripe deviation feature to obtain information about the weld seam and a weld bead for generating a welding gun operation control instruction; and repeating step S3 and step S4 until welding is completed.

7. The omni-directional weld seam tracking laser vision sensing method according to claim 6, wherein before outputting the laser closed stripe image by the image processing module (7), the method further comprises a step of searching an intersection point of laser stripes to obtain an outer circle contour of the laser closed stripe, and the output laser closed stripe image only comprises the outer circle contour.

8. The omni-directional weld seam tracking laser vision sensing method according to claim 6, wherein the information about the weld seam and the weld bead obtained by the information processing module comprises information about the weld seam after welding is completed.

* * * * *